United States Patent [19]

Antonov et al.

[11] 4,179,730
[45] Dec. 18, 1979

[54] SELF-OPTIMIZING CONTROL SYSTEM FOR OBJECT WITH UNIMODAL QUALITY FUNCTION

[75] Inventors: Boris M. Antonov, Khimki Moskovskoi oblasti; Viktor V. Vasiliev; Sergei I. Pischikov, both of Moscow, all of U.S.S.R.

[73] Assignee: Institut vysokikh temperatur Akademii Nauk SSSR, Moscow, U.S.S.R.

[21] Appl. No.: 891,226

[22] Filed: Mar. 29, 1978

[30] Foreign Application Priority Data

Apr. 8, 1977 [SU] U.S.S.R. .............................. 2476357

[51] Int. Cl.² .......................................... G05B 13/02
[52] U.S. Cl. .................................. 364/105; 318/561; 364/118; 364/121
[58] Field of Search ............... 364/105, 106, 118, 117, 364/121; 318/561

[56] References Cited

U.S. PATENT DOCUMENTS

| 3,287,615 | 11/1966 | Smyth | 364/105 X |
| 3,655,954 | 4/1972 | Speth | 365/105 |
| 3,880,348 | 4/1975 | Salihbegovic et al. | 364/105 |
| 3,934,124 | 1/1976 | Gabriel | 364/105 |

Primary Examiner—Joseph F. Ruggiero
Attorney, Agent, or Firm—Fleit & Jacobson

[57] ABSTRACT

Disclosure is made of a self-optimizing control system for an object with a unimodal quality function. The system comprises an object, a divider, a band-pass filter, an averaging filter, a multiplier, a final control element and an adder which are all placed in series to form a closed loop. The system further includes a search signal generator connected to a second input of the adder. The object's input is also connected to a second input of the divider. Second and third inputs of the final control element are connected to an input and output, respectively, of the band-pass filter. An output of the final control element is connected to a second input of the multiplier.

1 Claim, 1 Drawing Figure

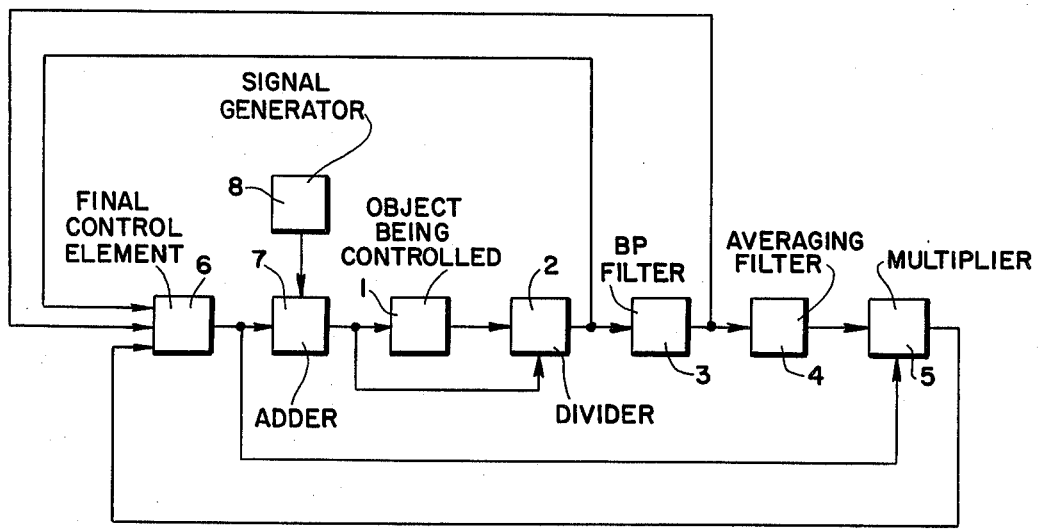

SELF-OPTIMIZING CONTROL SYSTEM FOR OBJECT WITH UNIMODAL QUALITY FUNCTION

FIELD OF THE INVENTION

The present invention relates to self-optimizing control systems and, more particularly, to systems for self-optimizing control of objects with a unimodal quality function. The system according to the invention can be used, for example, to ensure a maximum output of such energy sources as solar batteries, MHD generators, etc.

BACKGROUND OF THE INVENTION

There is known a self-optimizing control system comprising a search signal generator whose output is connected to a first input of a multiplier and a first input of an adder whose second input is connected via a final control element and an averaging filter to an output of the multiplier, an output of the adder being connected to an input of an object being controlled, while said object's output is connected to a second input of the multiplier.

The signal, applied to the input of the multiplier of the system under review, contains, apart form its useful component, harmonic components whose frequency is multiple to that of the search signal, whereas their amplitude is commensurable with that of the useful signal. Such harmonic components are, in fact, noise. A signal of a more complex spectrum is produced at the output of the multiplier.

The system under review is disadvantageous in its limited accuracy of control due to the presence of noise, and in its relatively low response due to the presence of the averaging filter intended for noise suppression, which, quite naturally, operates with a certain time lag.

There is further known a system for self-optimizing control of an object with a unimodal quality function. The accuracy of control and the response of this system are improved by interposing a band-pass filter between the object being controlled and the multiplier. It is only the fundamental harmonic which is separated from the object's output signal by the band-pass filter connected to the object's output. The fundamental harmonic is applied to the multiplier. At the multiplier's output there is produced a signal containing much less noise than in the case of the system described above. However, the signal at the output of the multiplier is not completely noisefree, which affects the accuracy and response of the system.

SUMMARY OF THE INVENTION

It is an object of the present invention to improve the accuracy and response of systems for self-optimizing control of objects with a unimodal quality function.

The foregoing and other objects of the invention are attained by providing a system for self-optimizing control of an object with a unimodal quality function, comprising a search signal generator and a final control element having their outputs connected via an adder to an input of an object under control, the system further including a band-pass filter, an averaging filter and a multiplier, and being characterized, in accordance with the invention, by that it still further includes a divider whose first input is connected to an output of the object under control, the divider's second input being connected to an output of the adder, whereas the divider's output is coupled via the series-connected band-pass filter, averaging filter and multiplier to a first input of the final control element whose second and third inputs are connected to the output of the divider and that of the band-pass filter, respectively, whereas an output of the final control element is connected to a second input of the multiplier.

BRIEF DESCRIPTION OF THE ACCOMPANYING DRAWING

Other objects and advantages of the present invention will become more apparent from the following detailed description of a preferred embodiment thereof to be read in conjunction with the accompanying drawing which is a block diagram of a self-optimizing control system for an object with a unimodal quality function, in accordance with the invention.

DETAILED DESCRIPTION OF THE INVENTION

Referring to the attached drawing, the proposed self-optimizing control system for an object with a unimodal quality function comprises an object 1 being controlled, featuring a unimodal quality function, a divider 2, a band-pass filter 3, an averaging filter 4, a multiplier 5, a final control element 6 and an adder 7 which are all placed in series to form a closed loop. The system further includes a search signal generator 8 whose output is connected to a second input of the adder 7. The object 1 also has its input connected to a second input of the divider. The output of the final control element 6 is connected to a second input of the multiplier 5. Second and third inputs of the final control element 6 are connected to an input and an output, respectively, of the band-pass filter 3.

The functions of the divider 2 and multiplier 5, respectively, can be performed by nonlinear units operating with functions of two variables, which are used in analog simulation, for example, units with diode squarers.

The band-pass filter 3 may be built around L-C elements and is tuned to the base frequency generated by the search signal generator 8.

The averaging filter 4 may also be built around L-C elements and further comprises a rectifier. As a sinusoidal signal is applied to the input of the averaging filter 4 from the output of the band-pass filter 3, a negative rectified signal is produced at the output of said averaging filter 4.

The search signal generator 8 may be a sinusoidal signal generator.

The search signal generator 8 may also be structurally combined with the final control element 6 and the adder 7. For example, in the case of controlling an MHD generator, the adder 7 is an inverter connected to a commercial network. In such a case the inverter also functions as the final control element 6 and the search signal generator 8 because it both controls the power flow from the MHD generator to the commercial network and forms a sinusoidal signal which is pulsating output voltage used as the search signal.

Consider operation of the system according to the invention for the case when the object under control has this quality function:

$$Q(X) = Ax - Bx^2,$$

where x is the actual value of the signal at the input of the object 1 being controlled; and A and B are parameters of said object 1.

Such an object has a unimodal quality characteristic which has only one extreme point.

A total signal x is applied to the input of the object 1 from the final control element 6 and the search signal generator 8:

$$x = x + a \sin \omega t,$$

where
x is the value of the signal at the output of the final control element 6;
a is the amplitude of the search signal;
$\omega$ is the circular frequency of the search signal; and
t is time.

The signal at the output of the divider 2 is:

$$A - Bx - Ba \sin \omega t.$$

The fundamental harmonic of this signal, equal to Ba sin $\omega$t, is produced at the output of the band-pass filter 3. At the output of the averaging filter 4 the signal is equal to B, provided that a $= \pi/2$ (this value is selected while calculating the search signal generator 8). The signal produced at the output of the multiplier 5 is equal to $-$Bx. The signal at the input of the final control element 6 is a sum total of the signals arriving from the outputs of the divider 2, band-pass filter 3 and multiplier 5. Clearly, the signal at the input of the final control unit 6 is:

$$A - 2Bx = [dQ(x)]/dx$$

and is noise-free.

Thus the accuracy of control of the system according to the invention is higher than that of conventional systems because a noise-free useful signal is applied to the input of the final control element 6.

The response of the proposed system is also better than that of conventional systems. The presence of the filters 3 and 4 does not affect the response because the signal at the output of the averaging filter 4 is invariant with respect to the input signal of the object 1 and is equal to $-$B. This is due to the introduction of the divider 2, whereby the filters 3 and 4 operate with a relative signal value which is constant with unimodal characteristics of the object under control.

What is claimed is:

1. A self-optimizing control system for an object with a unimodal quality function, comprising:
an input of said object being controlled; an output of said object being controlled; a divider having inputs and an output and connected with one of its inputs to said output of said object being controlled, and with its other input to said input of said object being controlled; an adder having inputs and an output and connected with its said output to said input of said object being controlled; a search signal generator having an input and an output and connected with said output to one of said inputs of said adder; a final control element having inputs and an output and connected with said output to another of said inputs of said adder; a band-pass filter having an input and an output and connected with said input to said output of said divider and with said input to a first of said inputs of said final control element; an averaging filter having an input and an output and connected with said input to said output of said band-pass filter and with said input to a second of said inputs of said final control element; a multiplier having inputs and an output of said averaging filter, with another of said inputs to said output of said final control element, and with said output to the third of said inputs of said final control elememt.

* * * * *